United States Patent [19]
Miskowiec

[11] Patent Number: 5,915,095
[45] Date of Patent: *Jun. 22, 1999

[54] METHOD AND APPARATUS FOR BALANCING PROCESSING REQUESTS AMONG A PLURALITY OF SERVERS BASED ON MEASURABLE CHARACTERISTICS OFF NETWORK NODE AND COMMON APPLICATION

[75] Inventor: Norman L. Miskowiec, Columbia Heights, Minn.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/512,738

[22] Filed: Aug. 8, 1995

[51] Int. Cl.$^6$ .................................................. G06F 13/14
[52] U.S. Cl. ............................... 395/200.53; 395/200.33; 395/200.36; 395/675; 370/255
[58] Field of Search ................................ 364/280, 281.3, 364/284.4; 395/200.01, 200.03, 200.09, 610, 680, 200.53, 200.33, 200.36, 200.57, 200.48, 675; 370/255

[56] References Cited

U.S. PATENT DOCUMENTS

| | | | |
|---|---|---|---|
| 4,481,583 | 11/1984 | Mueller | 395/732 |
| 4,839,798 | 6/1989 | Eguchi et al. | 395/675 |
| 5,115,505 | 5/1992 | Bishop et al. | 395/674 |
| 5,136,708 | 8/1992 | Lapourtre et al. | 395/673 |
| 5,155,851 | 10/1992 | Krishnan | 395/675 |
| 5,239,653 | 8/1993 | Cubero-Castan et al. | 395/800 |
| 5,241,677 | 8/1993 | Naganuma et al. | 395/675 |
| 5,271,003 | 12/1993 | Lee et al. | 370/58.2 |
| 5,335,268 | 8/1994 | Kelly, Jr. et al. | 379/112 |
| 5,341,477 | 8/1994 | Pitkin et al. | 395/200.56 |
| 5,410,651 | 4/1995 | Sekizawa et al. | 395/200 |
| 5,444,848 | 8/1995 | Johnson, Jr. et al. | 395/200.15 |
| 5,446,892 | 8/1995 | Suzuki et al. | 395/650 |
| 5,473,599 | 12/1995 | Li et al. | 370/16 |
| 5,537,542 | 7/1996 | Eilert et al. | 395/184.01 |
| 5,548,724 | 8/1996 | Akizawa et al. | 395/200.03 |
| 5,774,668 | 6/1998 | Choquier et al. | 395/200.53 |

OTHER PUBLICATIONS

H.C. Lin et al, A Dynamic Load Balancing Policy with a Central Job Dispatcher, Distrbuted Computing Systems, 1991 International Conference, 264, 1991.

D. Sitaram et al, Issues in the Design of Multi–Server Files System to Cope with Load Skew, Parallel and Distributed Information Systems 1993 Int's Conf., 214, 1993.

Publication "Comten 5600 Communications Processor," AT&T Global Information Solutions, SP–4532 0894.

Primary Examiner—Thomas C. Lee
Assistant Examiner—Harold J. Kim
Attorney, Agent, or Firm—William A. Munck

[57] ABSTRACT

Apparatus and methods are provided for balancing a plurality of received processing requests among a plurality of servers of a processing system network. At least a subset of the processing requests are received from one or more of a plurality of network nodes of the processing system network. Storage means are provided for storing one or more measurable characteristics for at least each of a first server and a second server, both of which are operative to run a common application. A control circuit is also provided and is operative to receive a processing request to run the common application from a particular network node. The control circuit is further operative, in response to the processing request, to allocate either the first and/or the second server to run the common application as a function of the one or more measurable characteristics.

26 Claims, 5 Drawing Sheets

METHOD AND APPARATUS FOR BALANCING PROCESSING REQUESTS AMONG A PLURALITY OF SERVERS BASED ON MEASURABLE CHARACTERISTICS OFF NETWORK NODE AND COMMON APPLICATION

A portion of the disclosure of this patent document contains material that is subject to copyright protection. The copyright owner has no objection to the facsimile reproduction by anyone of this patent document or the patent disclosure, as it appears in the Patent and Trademark Office patent files or records, but otherwise reserves all copyright rights whatsoever.

TECHNICAL FIELD OF THE INVENTION

The present invention relates generally to processing system network connectivity, and more particularly, to apparatus and methods for balancing processing requests among a plurality of servers in a processing system network.

BACKGROUND

A processing system network, such as a computer network, is a combination of network nodes and servers that are capable of communicating with one another over one or more communication paths or links. Each network node, as well as each server, is either an individual processing system, such as a computer, or another processing system network. Network nodes and servers communicate in order to share resources, such as databases and data files, processing applications, hardware peripherals, communication links and the like.

Each server typically performs at least one of three general functions or services, namely, file management, printing or communications. Network portal devices are typically used to couple network nodes and servers together to facilitate resource sharing. The portal device functions as a junction point through which the aforementioned server functions are requested, accessed and utilized by one or more network nodes.

Assume for example that a particular application, APPL_X, is resident to a single server. A user wishing to access APPL_X simply identifies it by name through a particular portal device. This is commonly referred to as "session establishment." This procedure is used to "name-access" (i.e., identify) APPL_X during "log-on" to the server. In the event the server and the application are available, the network node gains access to APPL_X and utilizes it. Otherwise, access is denied.

It is often desirable to make multiple copies of a particular application available on a single processing system network. Assume APPL_X is a popular application and that the server upon which it resides does not have the processing capacity to efficiently support all the network nodes wishing to access and utilize it. In response to such circumstances, additional copies of APPL_X are typically made available on other servers.

While these additional copies of APPL_X should increase server efficiency, as well as over-all processing system network throughput, this has rarely been the case in practice. This is due largely because the procedures for accessing a particular copy of APPL_X have become significantly more complicated.

Assume APPL_X is resident on two or more servers. If a user wishes to request, access and utilize APPL_X, the name of the particular copy of the application must be identified. One approach requires that each duplicate copy of the particular application be given a different name (e.g., APPL_X1, APPL_X2, . . . , APPL_Xn). The varied names are then associated with each of their respective servers. A user wishing to utilize this particular application is thus required to know the specific name of any duplicate copy that might be accessed.

Maintaining this information is at best difficult. Nonetheless it often becomes necessary to do so in the event a current server running one or more copies of an application fails or, alternately, if the processing response time of the current server is unacceptable. Users typically, and understandably so, have trouble remembering the various names of the applications. Accessing a particular application often becomes a time consuming and annoying process as the burden of selecting a server running the application, which hopefully provides an acceptable response time, falls upon the user. The user's selection of servers becomes a trial and error process. This difficulty is compounded when considering that one or more application copies are sometimes moved from one server to another.

There accordingly exists a need in the art to simplify the requirements for a user to gain access to a single one of multiple copies of a particular application on a processing system network, wherein the multiple copies reside on different servers.

There exists a further need to substantially minimize a user's involvement in selecting a server to run a particular application with as prompt a processing response time as is then available.

SUMMARY OF THE INVENTION

Broadly, the present invention is directed to apparatus and methods which provide processing system network connectivity, and more particularly, which balance processing requests across a plurality of servers of a processing system network with little or no user involvement.

The principles of the present invention are particularly advantageous when utilized in connection with Server-based or Peer-to-Peer Networking, as well as in connection with other suitable connectivity strategies. Server-based Networking is a connectivity strategy which dedicates one or more servers to providing one or more of the server functions of file management, printing or communications. Peer-to-Peer Networking is a connectivity strategy which distributes server functions among a number of different processing systems. These processing systems perform server operations part of the time, and perform non-server operations otherwise.

An exemplary apparatus in accordance with the principles of the present invention concerns balancing a plurality of received processing requests among a plurality of servers. The processing requests are received from one or more network nodes. The apparatus includes a plurality of communication ports, a storage means and a control circuit. A subset of the communication ports are in operative communication with at least a first server, a second server and a first network node. At least each of the first and the second servers are operative to run a common application.

The storage means is operative to store one or more measurable characteristics for at least each of the first and the second servers. The control circuit is operative to receive a processing request to run the common application from the first network node. In response to this request, the control circuit is further operative to allocate at least one of the first server and the second server to run the common application as a function of the one or more measurable characteristics.

An important aspect of any apparatus, and in particular any control circuit, in accordance with the principles of the present invention is that it may be processing system, firmware or hardware based.

A method in accordance with the principles of the present invention concerns balancing a plurality of received processing requests among a plurality of servers of a processing system network. The processing system network also includes at least one network node. One or more of a plurality of measurable characteristics are stored for at least a subset of the plurality of servers.

At least each of a first and a second server is operative to run a particular application. A first processing request to run this application is received from a first network node. In response to the first processing request at least one of the first or the second server is allocated to run the application as a function of a subset of the plurality of measurable characteristics.

One embodiment for using and/or distributing the present invention is as software. The software includes a plurality of processing unit instructions which are stored to a conventional storage medium. The instructions are readable and executable by one or more processing units. The instructions, upon execution, operate to control the one or more processing units to balance a plurality of processing requests among a plurality of servers. Preferred storage media include without limitation, magnetic, optical, and semiconductor, as well as suitably arranged combinations thereof.

Advantageously, the present invention simplifies the requirements for a user to gain access to one out of a plurality of copies of a particular application on a processing system network, wherein the multiple copies of the application reside on different servers.

Another advantage is that the present invention substantially minimizes a user's involvement in selecting a server to run a particular application, and further, that the selected server has as prompt a processing response time as is available.

BRIEF DESCRIPTION OF THE DRAWINGS

For a more complete understanding of the present invention, and the advantages thereof, reference is now made to the following Detailed Description of the Invention taken in conjunction with the accompanying drawings in which like numbers designate like parts, and in which.

DETAILED DESCRIPTION OF THE INVENTION

Figure 1:
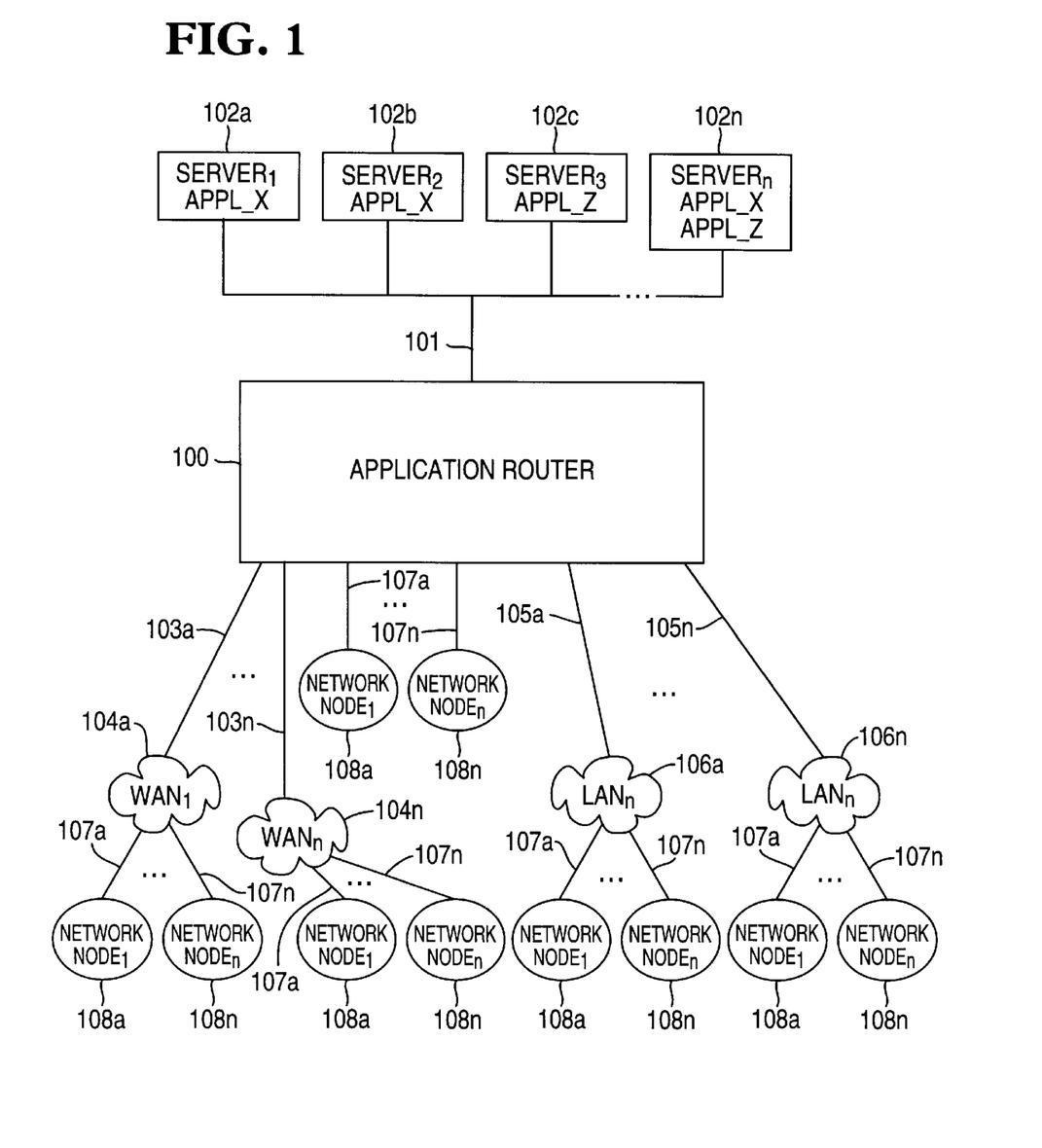
FIG. 1 illustrates a block diagram of an exemplary processing system network.

FIG. 1 illustrates a block diagram of an exemplary processing system network in which the principles of the present invention are particularly advantageous. An application router ("Router") 100, which is a network portal device, is shown suitably coupled via communication bus 101 with a plurality of processing system network servers 102a to 102n. In a preferred exemplary embodiment, Router 100 is a Comten 56XX Front End Processor available from AT&T Global Information Solutions Co. ("AT&T GIS") located in Dayton, Ohio, U.S.A.; communication bus 101 is a conventional ethernet card, such as a model no. 5919-F110, available from AT&T GIS, located in Roseville, Minn., U.S.A.; and each of servers 102a to 102n may be any suitable conventional processing system-based server, such as, for example, an AT&T GIS 3525, available from AT&T GIS, located in Columbia, S.C., U.S.A.

Router 100 is further coupled via communication buses 103a to 103n to one or more wide area networks ("WANs") 104a to 104n. Each WAN 104 is a collection of independent and distinct network nodes. WAN network nodes work together over communication links that are typically relatively long. These communication links are routinely provided by third-party carriers such as by long-distance telephone companies. The InterNet is an example of a worldwide WAN. Communications between WAN network nodes are generally characterized by relatively slow signal transfer rates.

Router 100 is also coupled via communication buses 105a to 105n to a plurality of local area networks ("LANs") 106a to 106n. Each LAN 105 is a group of communicating network nodes that are located relatively close to one another, such as within the same building or building complex. The communication links between LAN network nodes are typically characterized by relatively high-speed data transfer rates as compared with communications between WAN network nodes.

Each of Router 100, WANs 104, and LANs 106 are coupled with a plurality of network nodes 108a to 108n via conventional data buses. Each network node 108 may in point of fact be a processing system (e.g., a personal computer) or another processing system network (e.g., a LAN or a WAN). The processing system may suitably be operated by one or more human users. In alternate embodiments, the processing system may suitably be arranged to operate automatically with little or no user intervention.

Router 100 provides network connectivity between a plurality of servers 102 and a plurality of network nodes 108. This facilitates the sharing of resources, and in particular the balancing of processing requests, which involves the transfer and reception of large amounts of information. This information is typically divided into packets, frames, groups, etc. ("data packets"). Each data packet being a collection of related data items including discrete data, address and/or instruction objects. Included within these discrete objects is information necessary to route the data packet between various network nodes 108 and servers 102.

Figure 2:
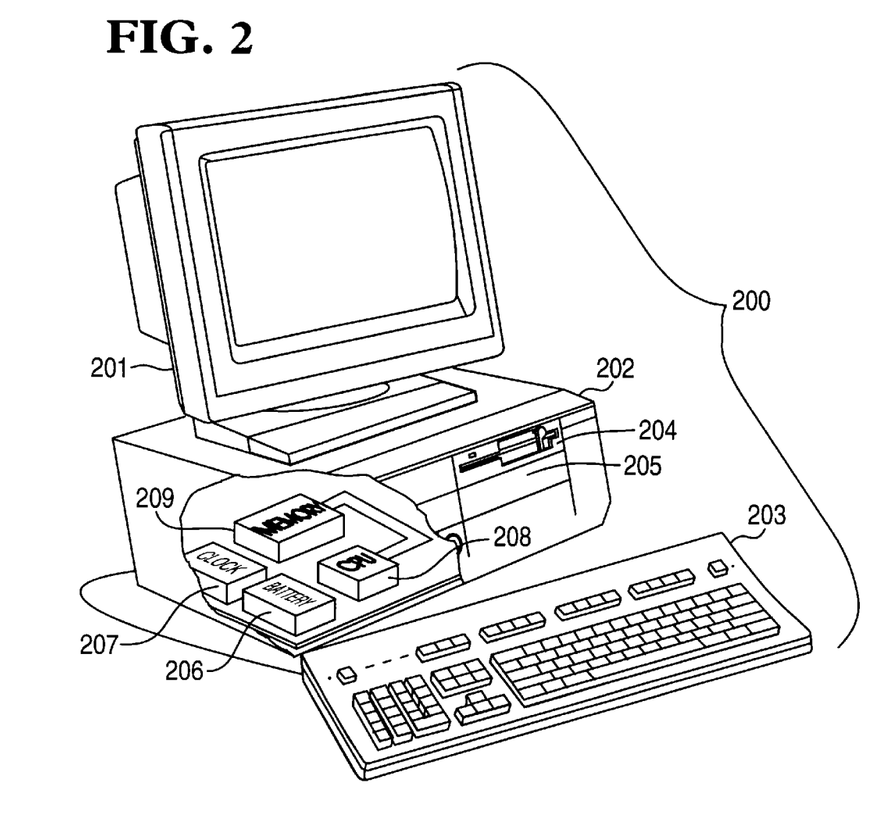
FIG. 2 illustrates an isometric view of an exemplary processing system capable of functioning as a network node within the processing system network of FIG. 1.

FIG. 2 illustrates an isometric view of an exemplary processing system 200 capable of functioning as either a network node 108 or a server 102. Processing system 200 is a suitably equipped conventional personal computer, such as an AT&T Globalyst 3356, model no. 1006, available from AT&T GIS, located in Dayton, Ohio, U.S.A., for example.

Processing system 200 includes a monitor 201, a housing 202 and a keyboard 203. Monitor 201 and keyboard 203 may suitably be replaced by other conventional output and input devices, respectively. Housing 202 includes both a floppy disk drive 204 and a hard disk drive 205. Floppy disk drive 204 is suitably operative to receive, read and write to external disks and hard disk drive 205 is suitably operative for fast access storage and retrieval. Floppy disk drive 204 may be replaced by or combined with other conventional structures operative to receive and transmit data and/or instructions, including without limitation, tape and compact disc drives, telephony systems and devices (including videophone, paging and facsimile technologies), and serial and parallel ports.

Housing 202 is illustrated having a cut-away portion which includes a battery 206, a clock 207, a processing unit 208 and a memory storage device 209. Processing unit 208 is suitably coupled with memory storage device 209. Although processing system 200 is illustrated having a single processing unit, a single hard disk drive and a single memory storage device, processing system 200 may be equipped with a plurality of processing units and/or suitably arranged memory storage devices.

It should be noted that any conventional processing system having at least one processing unit which is suitable to function as one of a network node or a server may suitably replace, or be utilized in conjunction with, processing system 200, including without limitation, videophones, telephones, televisions, sophisticated calculators, and hand-held, laptop/notebook, mini, mainframe and super computers, including RISC and parallel processing architectures, as well as within processing system network combinations of the foregoing. Conventional processing system architecture is more fully discussed in *Computer Organization and Architecture*, by William Stallings, Mac-Millan Publishing Co. (3rd ed. 1993), which is incorporated herein by reference. Alternate processing system embodiments may be firmware or hardware based.

Figure 3:
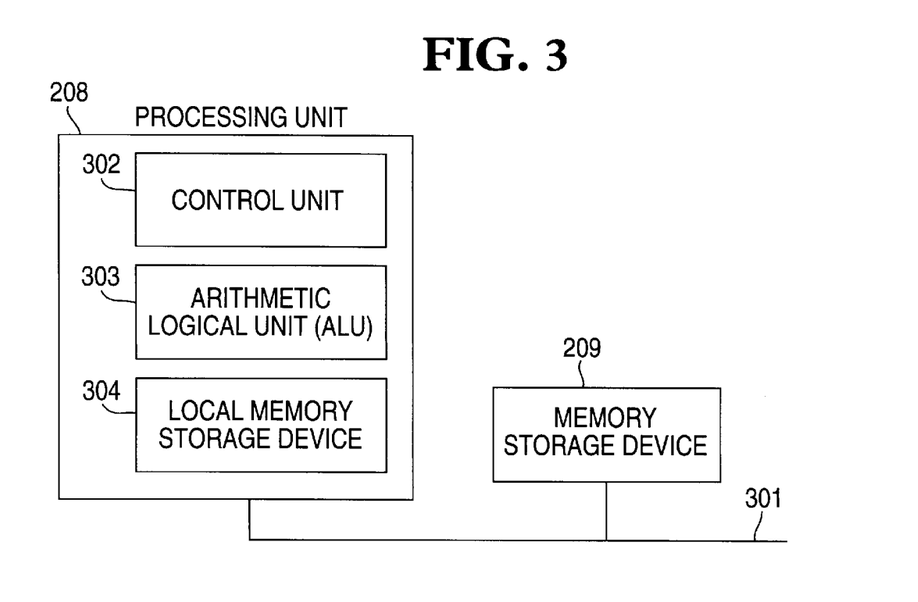
FIG. 3 illustrates a block diagram of a microprocessing system which may be utilized in conjunction with the processing system of FIG. 2.

FIG. 3 illustrates a block diagram of one exemplary microprocessing system which may suitably be utilized in conjunction with processing system 200 of FIG. 2. The microprocessing system includes a single processing unit 208 coupled via data bus 301 with a single memory storage device 209. Memory storage device 209 is suitably operative to store data and/or one or more processing system instructions which processing unit 208 is operative to retrieve and execute. Memory storage device 209 may be any suitable conventional memory storage device. Processing unit 208 includes a control unit 302, an arithmetic logic unit ("ALU") 303, and a local memory storage device 304 (e.g., stackable cache, a plurality of registers, etc.). Control unit 302 is operative to fetch processing system instructions from memory storage device 209. ALU 303 is operative to perform a plurality of operations, including addition and Boolean AND, needed to carry out those instructions. Local memory storage device 304 is operative to provide local high speed storage used for storing temporary results and control information.

Figure 4:
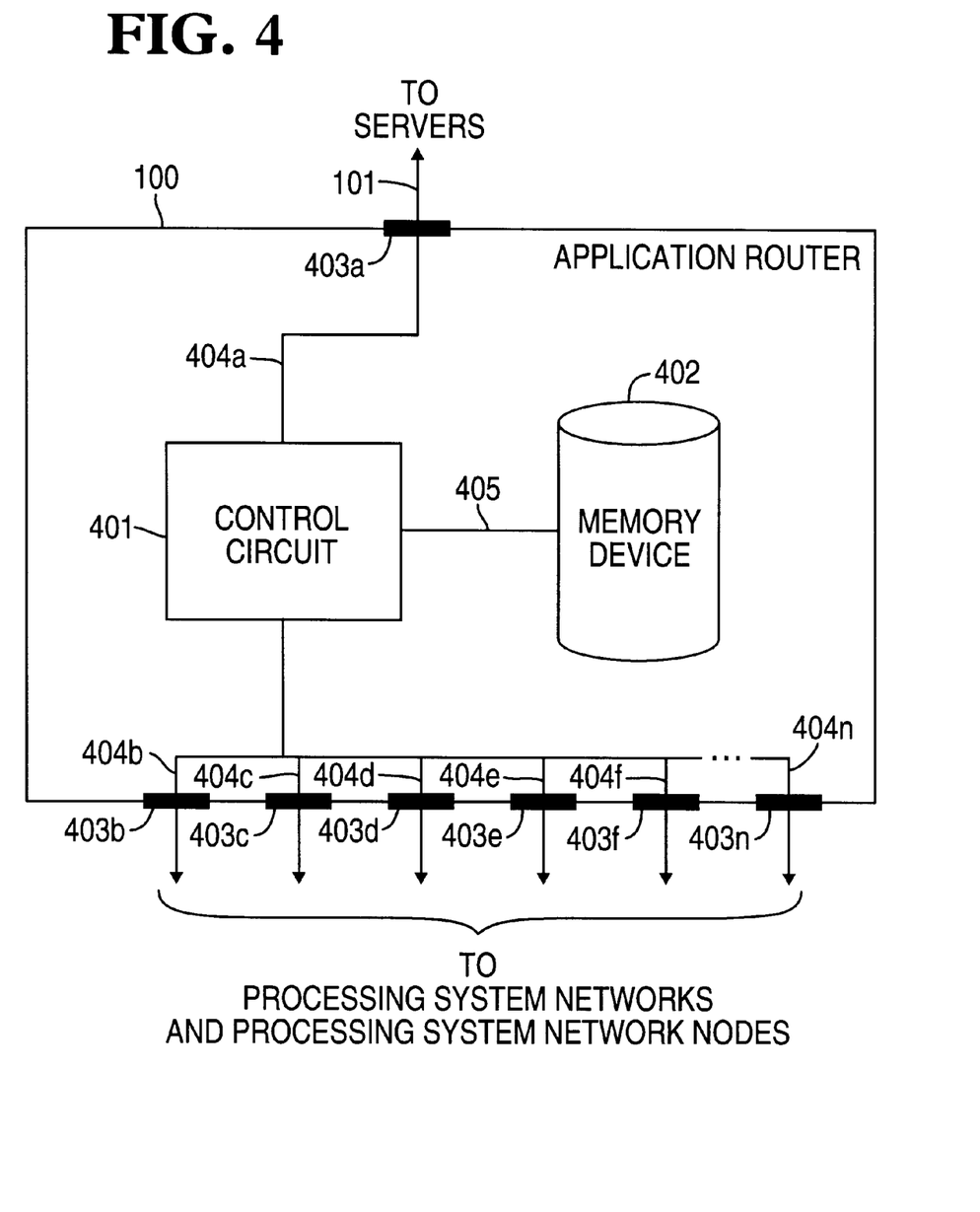
FIG. 4 illustrates a block diagram of an exemplary circuit operable to balance a plurality of received processing requests among a plurality of servers of a processing system network in accordance with the principles of the present invention.

FIG. 4 illustrates a block diagram of an exemplary Router 100 in accordance with the principles of the present invention. Router 100 is operative generally to route a plurality of discrete data, address and/or instruction objects around a processing system network. Router 100, more particularly, is operative to receive a plurality of processing requests from one or more network nodes 108 and to balance at least a subset of these requests among a plurality of servers 102. Recall that each network node 108 and each server 102 may in point of fact be any of a processing system, a LAN or a WAN.

As previously discussed, in one preferred exemplary embodiment, Router 100 is a Comten 56XX Front End Processor which is available from AT&T GIS. The Comten 56XX Front End Processor is more fully disclosed in the "Comten 5630 Communications Processor—Maintenance Guide," NCR Document No. D2-576-A, which is incorporated herein by reference. This documentation is available upon request from AT&T GIS by contacting AT&T GIS Information Products Publishing which is located in Dayton, Ohio, U.S.A. Alternate preferred exemplary embodiments of Router 100 include without limitation other suitably arranged processing systems, programmable logic devices, such as PALs (programmable array logic) and PLAs (programmable logic arrays), DSPs (digital signal processors), FPGAs (field programmable gate arrays), ASICs (application specific integrated circuits), and the like.

Router 100 includes a control circuit 401, a conventional memory device 402 and a plurality of conventional communication ports 403a to 403n. Control circuit 401 is shown suitably coupled with each one of communication ports 403a to 403n via a plurality of conventional buses 404a to 404n. Each communication port 404 facilitates, when in operative communication with either one of a server or a network node, communication between control circuit 401 and that particular server or network node.

"Operative communication" as used herein includes without limitation both wired and wireless communication, whether or not such communication is directly or indirectly maintained. "Wired communication" includes without limitation communication via conventional data transmission media such as copper wire, fiber optic cable, and the like. "Wireless communication", on the other hand, includes without limitation conventional transmission and reception of radio waves, microwaves, infrared light, and the like.

Memory device 402 is operative to store one or more measurable characteristics for at least each of a subset of the plurality of servers. Each of the measurable characteristics may be stored either statically or dynamically. It is assumed that two or more servers within the subset of servers are suitably operative to run a common application. "Common application" as used herein shall include without limitation any software, firmware or hardware implementation which is operative to produce one or more specified results and/or perform one or more specified tasks.

In preferred exemplary embodiments, at least one of the stored measurable characteristics is selected from a group consisting of server processing capacity, server remaining processing capacity, server memory capacity, server remaining memory capacity, server capacity, server priority, server on/off, current network nodes servicing, current common application requests servicing, and application priority.

"Server processing capacity" is the relative maximum quantity of discrete objects that a particular server is capable of processing during a given time period. "Server remaining processing capacity" is the server processing capacity less the current number of discrete objects that a particular server is processing during the given time period.

"Server memory capacity" is the relative maximum quantity of data that may be maintained near simultaneously in a particular memory storage device. "Server remaining memory capacity" is the server memory capacity less the current quantity of data being maintained in a particular memory storage device.

"Server capacity" is the overall productivity of a particular server, preferably as expressed in processing task or work completed per a given time period.

"Server priority" is an indicator associated with one or more servers, and which is indicative of a ranking of preferred servers. "Server on/off" is an indicator indicating whether a particular server is currently powered up or not, or alternatively, whether the particular server is available. "Current network nodes servicing" is an indicator indicating the relative total number of network nodal requests and/or sessions that a particular server is presently supporting. "Current common application requests servicing" is an indicator indicating the relative total number of network nodal requests and/or sessions that a particular server is presently supporting for a common application. "Application priority" is an indicator associated with one or more applications" and is indicative of a ranking of preferred applications.

It should be noted that in other preferred exemplary embodiments, the foregoing list of measurable characteristics is considered neither inclusive nor exclusive. In point of fact any suitable measurable characteristic may be utilized.

Control circuit 401 is shown suitably coupled with memory device 402 via bus 404. Control circuit 401 is operative to receive one or more processing requests to run the common application from at least one network node 108. In response to the received processing requests, control circuit 401 accesses memory device 402 and processes one or more of the measurable characteristics associated with two or more servers operable to run the common application. Control circuit 401 allocates, as a function of the one or more processed measurable characteristics, at least one server to run the common application.

In a preferred exemplary embodiment, a subset of the one or more measurable characteristics are priority ranked such that one or more servers having at least a portion of this subset will be preferred, and hence selected, over one or more servers that do not, or vice versa. In another preferred exemplary embodiment, common subsets of the one or more measurable characteristics are compared with one another, and/or alternatively with one or more predetermined values, to identify one or more suitably arranged servers. It should be noted that any comparative-type processing or analysis utilizing one or more measurable characteristics may suitably be used to allocate one or more servers to run the common application.

It is contemplated, that in circumstances wherein two or more servers are allocated to run the common application, the allocated servers may run the common application separately or, alternatively, in parallel. The ability to allocate two or more discrete servers and to direct them to run substantially cooperatively the common application are known parallel processing techniques.

In alternate exemplary embodiments, control circuit 401, after one or more servers have been allocated, is operative to receive a signal, possibly from one or more of the allocated servers, indicating that one or more of the allocated servers are unavailable to run the common application. Control circuit 401, in response to this received signal, allocates (reallocates) one or more suitable servers to run the common application as a function of one or more of the measurable characteristics. During the allocation (reallocation) process, control circuit 401 may, or may not, consider the one or more unavailable servers' inability to satisfy the prior allocation request as a measurable characteristic.

In one preferred exemplary embodiment, control circuit 401 is operative, in response to the received signal, to allocate one or more of the next "best" servers to run the common application. In another exemplary embodiment, when a server, whether allocated or not, becomes unavailable, it is simply removed from a list of servers which provide the common application.

Recall that one preferred exemplary embodiment for using and/or distributing the present invention is as software. The software includes a plurality of processing unit instructions which are stored to a conventional storage medium, such as memory device 402. A preferred exemplary software source code implementation is attached hereto as an Appendix. In preferred exemplary embodiments, control circuit 401 includes one or more processing units, such as microprocessor 208 of FIGS. 2 and 3. The one or more processing units are operative to retrieve and execute a subset of the plurality of processing instructions from the storage medium. This subset of processing instructions operates upon execution to direct control circuit 401 to alocate at least one server to run the common application.

Note that communication port 404a is shown, when taken in conjunction with FIG. 1, to couple control circuit 401 substantially in parallel with a plurality of servers 102 via conventional bus 101. In contrast, communication ports 404b to 404n are shown, again in conjunction with FIG. 1, to couple control circuit 401 separately with each one of a plurality of network nodes 108. In alternate exemplary embodiments one or more of servers 102 may suitably be coupled separately with control circuit 401, and/or one or more of network nodes 108 may suitably be coupled substantially in parallel to control circuit 401.

The functionality of memor device 402 may be provided by one or more suitable data structures arranged within any suitable number of conventional memory storage devices. Further, although memory device 402 is shown to juxtapose control circuit 401, it may in point of fact be suitably arranged within circuit 401 or alternatively external and juxtaposed to Router 100.

Figure 5:
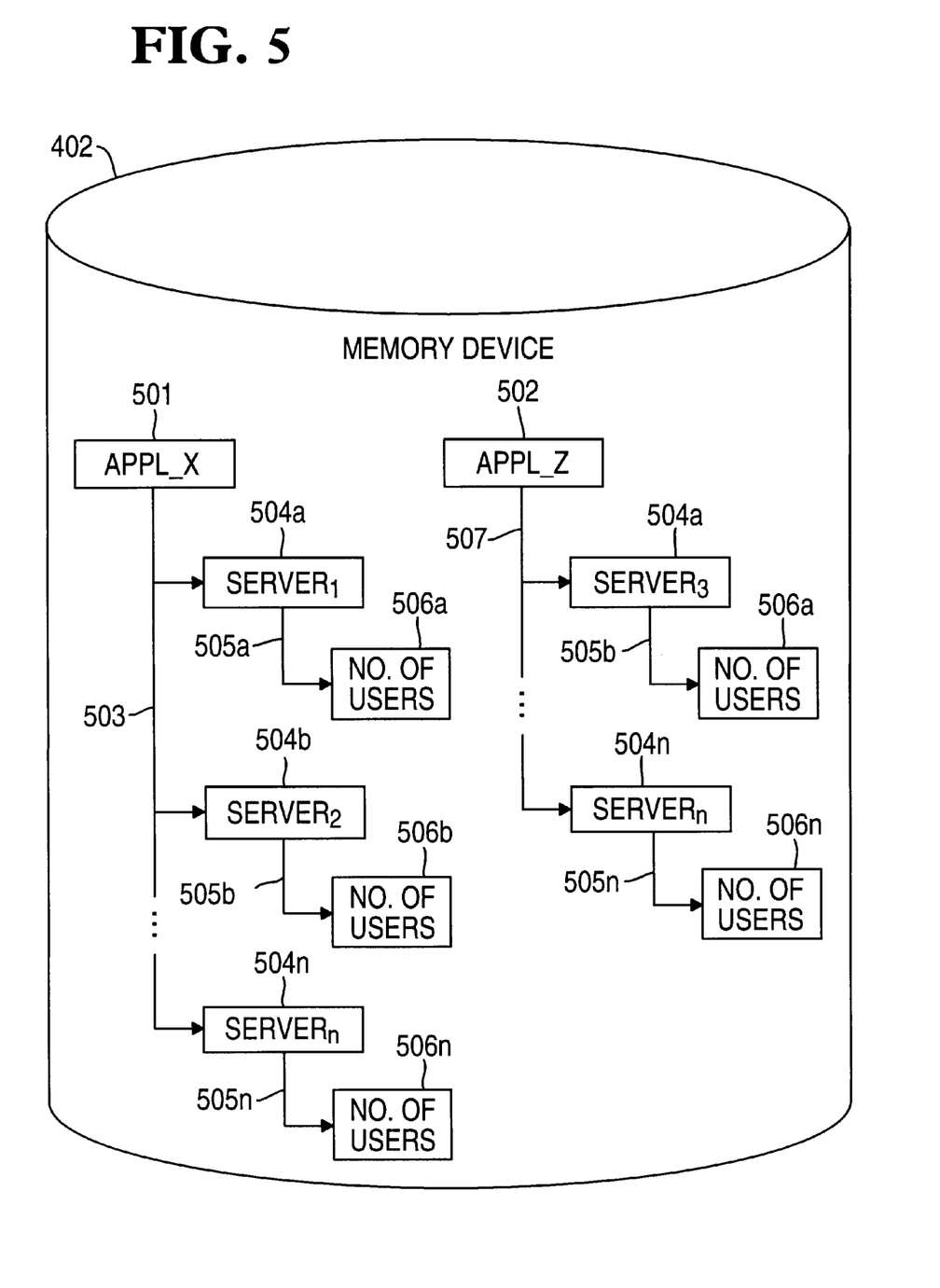
FIG. 5 illustrates a block diagram of an exemplary conventional memory device that may be utilized in conjunction with the exemplary control circuit of FIG. 5.

FIG. 5 illustrates a block diagram of one exemplary conventional memory device 402 that may suitably be utilized in conjunction with exemplary control circuit 401. Memory device 402, taken in conjunction with FIG. 1, is shown to include an exemplary measurable characteristic, "No. of Users" 506a–506n, associated with each of the servers running at least one of APPL__X 501 and APPL__Z 502. Note that each of the exemplary data structures utilizes a linked list of data cells. Control circuit 401 is further operative to traverse one or more linked lists 503, 505, 507 to retrieve a particular linked measurable characteristic from one or more of the data cells 504, 506.

Figure 6:
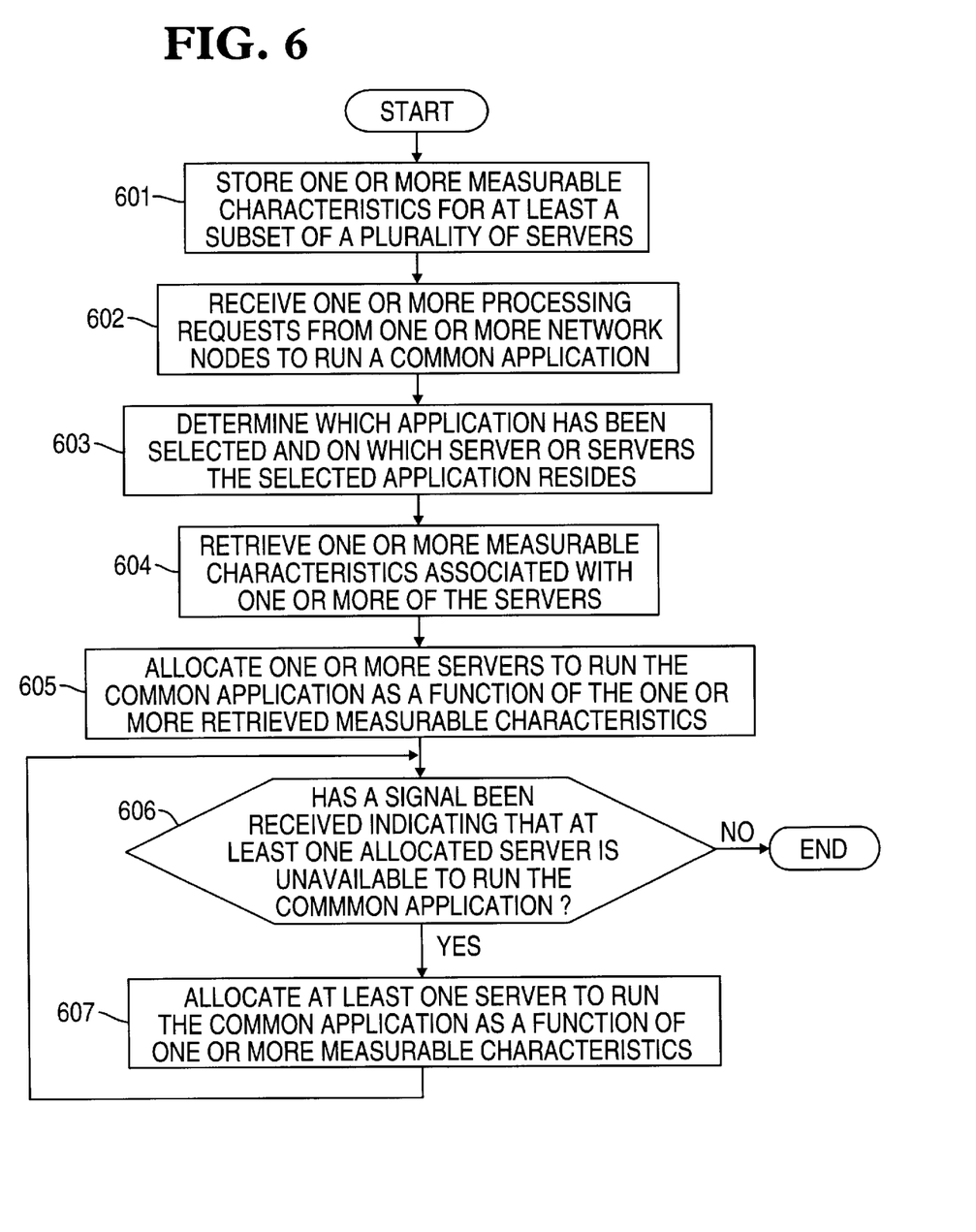
FIG. 6 illustrates a flow diagram for balancing a plurality of received processing requests among a plurality of servers of a processing system network in accordance with the principles of the present invention.

FIG. 6 illustrates a flow diagram for balancing a plurality of received processing requests among a plurality of servers of a processing system network in accordance with the principles of the present invention. With illustrative reference to FIGS. 1, 4 and 5, one or more of a plurality of measurable characteristics 506 are stored for at least a subset of servers 102 (process step 601). The measurable characteristics are preferably stored in one or more conventional memory storage devices, such as exemplary memory device 402. This storage process may utilize any suitable conventional data structure configuration, such as linked lists, arrays, matrices, data bases, and the like.

Preferably, at least two of the plurality of servers 102 are operative, separately and/or cooperatively, to run a particular common application, such as APPL__X 501 and/or APPL__Z 502.

A network portal device, such as Router 100, receives the processing requests from one or more network nodes 108 (process step 602). At least a first received processing request is to run the common application. The first processing request is processed, such as by control circuit 401, to determine which application has been requested, as well as to identify a subset of servers 102 on which the application resides (process step 603). Control circuit 401 retrieves one or more of the measurable characteristics associated with one or more of the servers within the subset (process step 604).

Control circuit 401, in response to the first processing request, allocates at least one of the two or more servers 102 to run the requested application as a function of the subset of measurable characteristics (process step 605). Allocate as used herein includes without limitation allot, appoint, apportion, assign, choose, delegate, designate, elect, pick, select, signify, specify, and the like. In alternate embodiments, the forgoing allocation step also may suitably be effected as a function of at least one of balancing one or more of the plurality of processing requests among one or more of the plurality of servers 102 and/or overall server response time.

Control circuit 401 is further operative to receive a signal indicating that at least one allocated server 102 has become unavailable (decision step 606). Control circuit 401, in response to the received signal, allocates (reallocates) at least one server 102 to run the common application as a function of at least one of the measurable characteristics (process step 607). Control circuit 401 may or may not reconsider the previously allocated and unavailable server when allocating (reallocating) one or more of servers 102. In one alternate exemplary embodiment, control circuit 401 is operative to allocate one or more of the next best servers 102 to run the common application. "Next best" may include, without limitation, one or more of the remaining available servers 102 in rank/priority order.

In alternate preferred exemplary embodiments, if more than one server had previously been allocated to run the common application, the one or more allocated and unavailable servers may suitably be removed from a maintained list of available servers. The common application would then simply be run on the allocated and available servers.

Although the present invention and its advantages have been described in detail, it should be understood that various changes, substitutions and alterations can be made herein without departing from the spirit and scope of the invention.

APPENDIX

```
/*********************************************************************
.*
.*    SNA/Open Gateway Session Manager
.*
**********************************************************************

/*********************************************************************
.*
.*    ROUTINE NAME: s_send open XEOSSDOP
.*                  (Event = device logon from CAM / State = closed
.*
.*    BASIC FUNCTION:   Send an open to the server for a device that wants
.*                      to logon to a server application.
.*
.*    METHOD:
.*    Set state to opening
.*    If duplicate applications exist
.*       If_s load_balance fails
.*          Return
.*    Else
.*    {
.*    Get appl_addr from sess cb
.*    Get a data link for this session
.*    Queue this session control block to the link control block
.*    Lease a buffer and build a session printer open message
.*    Copy application name to the message
.*    Copy device name to the message
.*    Copy logmode data to the message
.*    If logon data
.*       Set message size to include the data
.*       Link the data to the message
.*       copy logon_bfc and save in sess for retry, if needed
.*       Set end-of-record at end of data
.*    Else
.*       Set length for header only and set end-of-record at end of header
.*    Call link send data
.*    Return to caller
.*    }
.*
.*    CALL PARAMETERS: sess, appl, logon data, pointer to logmode data
.*
.*    RETURN PARAMETERS: None
.*
**********************************************************************
int s_send_open(sess, CAM_appl, logon_bfc)
struct sng_sess *sess; /* session control block */
struct sng_appl *CAM appl; /* application control block */
OTBFR2     *logon_bfc; /* possible logon data */
{
```

APPENDIX-continued

```
    struct sng_appl *appl; /* application control block */
    struct sng_link *link; /* link control block */
    struct sng_dcb *dcb; /* dcb */
    OTBFR2 *bfc; /* buffer Pointer */
    OTBFR2 *next bfc; /* buffer Pointer */
struct sng_message *msg; /* gateway message */
unsigned int     index; /* loop index */
dcb = sess—>devc_addr—>dcb_addr;
*/   set state to opening, link session to its appl   */
sess—>state = SESS_OPENING;
/* are there duplicates? */
if(CAM_appl—>ul_dupl.head != NULLDUPL)
        {
        /*   yes, perform load balancing    */
        if ((appl = s_load_balance(CAM_appl,sess)) == NULLDUPL)
            {
            /* can't get to any of the servers, fail the logon */
            if (logon_bfc != NULLBFR2)
                sng_release(logon_bfc);
            s_rtn_sess(sess);
            return(CALL_FAILED);
            }
        }
else
    appl = CAM appl;
sess—>appl_addr = appl;
/*   find a data link for this session    */
if ((link = 1_get_link(appl)) == NULLLINK)
        {
        /*   no data links established, fail the logon attempt    */
        if (logon_bfc != NULLBFR2)
            sng_release(logon_bfc);
        s_rtn_sess(sess);
        return(CALL_FAILED);
        }
sess—>link_addr = link;
/*      queue this session to the data link       */
sessq(link)
/*      build the terminal session open message       */
bfc = (OTBFR2 *)clease(1, _UNC, _NOHET);
msg = (struct sng_message *)&(bfc—>bfrstart[0]);
msg—>id = SESS_TERM_OPEN;
msg—>u_m.s_term_open.u_client_id.cb_pointer = sess;
msg—>u_m.s_term_open.u_client_id.id_number = sess—>sess_id;
msg—>u_m.s_term_open.u_d.dev_char = 0;
msg—>u_m.s_term_open.u_o.options = 0;
msg—>u_m.s_term_open.u_d.d.extended = dcb—>extended;
msg—>u_m.s_term_open.u_d.d.wsf_rpq = dcb—>wsf_rpq;
msg—>u_m.s_term_open.horizontal = dcb—>horizontal;
msg—>u_m.s_term_open.vertical = dcb—>vertical;
msg—>u_m.s_term_open.alt_horizontal = dcb—>alt_horizontal;
msg—>u_m.s_term_open.alt_vertical = dcb—>alt_vertical;
msg—>u_m.s_term_open.in_size = dcb—>in_size;
msg—>u_m.s_term_open.out_size = dcb—>out_size;
msg—>u_m.s_term_open.u_d.d.start_stop = dcb—>start_stop;
for (index = 0; index < 8; ++index)
        mag—>u_m.s_term_open.appl_name[index] =
            appl—>aht_addr—>acb_addr—>appl_name[index];
for (index = 0; index < 8; ++index)
        msg—>u_m.s_term_open.devc_name[index] =
            sess—>devc addr—>dcb addr—>cam name[index];
msg—>u_m.s_term_open.u_d.d.sess_type = SESS_TYPE_1;
msg—>u_m.s_term_open.u_o.o.definite = 0;
msg—>u_m.s_term_open.u_o.o.xlate = 0;
for (index = 0; index < LOGMODE_SIZE; ++index)
        msg—>u_m.s_term_open.logmode[index] = dcb—>logmode_name[index];
if (logon_bfc != NULLBFR2)
        {
        /* loop thru logon data, keep count of total bytes */
        for(index=0,next_bfc = logon_bfc; next_bfc != NULLBFR2;
            next_bfc = next_bfc—>bfrchain)
            index+ = next_bfc—>bfrtextk;
        /* copy the logon data, save for possible retry */
        s_copy_logon_bfc(sess,logon_bfc);
        }
bfc—>bfrchain = logon_bfc;
if (logon_bfc != NULLBFR2)
        {
        set_msg_length_3((sizeof(struct sess_term_open)), index);
```

APPENDIX-continued

```
else
    {
    set_msg_length_1((sizeof(struct sess_term_open)));
    }
    }
    }
    /*   trace send open  */
    sngt(sess,sng_s_send_open,(long)link,(long)bfc,(long)sess);
/*   send the message
1_send_data(link,bfc);
return(CALL_SUCCEEDED);
}
/****************************************************************
.*
.*    ROUTINE NAME:   s_load_balance
.*
.*                        (Event = device logon from CAM / State = closed
.*
.*    BASIC FUNCTION:    Return a pointer to the least utilized server for
.*                        the duplicate applications.
.*
.*    METHOD:
.*    Loop through all duplicate appls and find the
.*    server with the fewest concurrent sessions
.*       Before comparing session counts, each server is tested:
.*       - to see if a session to this server was already tried, and
.*       - to verify it has data links available
.*
.*    Return a pointer to the appl whose server will get the logon, or
.*    return NULLDUPL, indicating no server is available
.*
.*    CALL PARAMETERS: sess, appl
.*
.*    RETURN PARAMETERS: Pointer to appl
.*
.*
.****************************************************************/
static struct sng_appl *s_load_balance(CAM_appl, sess)
struct sng_appl *CAM_appl; /* application control block */
struct sng_sess *sess; /* session control block */
{
struct sng_appl *dupl; /* application control block */
struct sng_appl *min_dupl; /* application control block */
struct sng_serv *serv; /* serv control block */
unsigned long sessions; /* used for comparing session count */
sessions - 99999;
/* set up for return indicating no server found
min_dupl = NULLDUPL;
for (dupl = CAM_appl; dupl != NULLDUPL; dupl dupl =—>ul_dupl.next)
        {
        serv = dupl—>peer addr—>serv_addr;
        /* make sure each server has not already been tried, */
        /* and data links are available */
        if ((1_get_link(dupl) != NULLLINK) && (serv—>rtry_flag != 1))
            {
            if (sessions > serv—>stats.c_sessions)
                {
                /* store new session count and dupl pointer
                sessions = serv—>stats.c_sessions;
                min dupl = dupl;
                }
            }
        }
}
sngt(min_dupl,sng_s_dupl,(long)DUPL_LOGON_S,
        (long)min_dupl,(long)serv);
return(min_dupl);
}
/****************************************************************
.*
.*    ROUTINE NAME:   s_retry_load_balance
.*                        (Event = received open reject State = SESS_OPENING
.*
.*    BASIC FUNCTION:    Retry session logon with same application, but
.*                        on a different server
.*
.*    METHOD:
.*    If a retry bfr doesn't exist
.*       Lease one and initialize it
.*    Increment retry count and log serv in bfr
.*    If retry count < max retries allowed
.*       Mark all servs that have not yet been tried
```

APPENDIX-continued

```
.*      Send logon attempt to the serv with the fewest sessions
.*      Return success
.*   Else
.*      Return error
.*
.*   CALL PARAMETERS: appl, sess
.*
.*   RETURN PARAMETERS: return appl or NULLAPPL *
.*
.*******************************************************************
static struct sng_appl *s_retry_load_balance(sess)
struct sng_sess *sess; /* session control block */
{
struct sng_appl    *appl; /* appl control block */
struct sng_appl    *CAM_appl; /* appl cb */
struct sng_serv    *serv; /* serv cb */
struct sng_rtry    *rtry; /* session logon retry buffer */
OTBFR2 int         *bfr; /* pointer to buffer */
int                indx
appl = sess—>appl_addr;
serv = appl—>peer_addr—>serv_addr;
sngt    (appl,sng s dupl,(long)DUPL RETRY_LOGON_S,
        (long)serv,(long)sess);
if ((bfr = sess—>retry_bfr) == NULLBFR2)
   {
   /* lease a buffer to keep track of retry attempts */
   bfr = (OTBFR2 *)clease(1,_UNC,_NOHET);
   rtry = (struct sng_rtry *) &(bfr—>bfrstart[0]);
   sess—>retry_bfr = bfr;
/* initialize count and serv pointers */
         rtry—>retry_count = 0;
         for (indx = 0; indx < MAX_RETRY; indx++)
            rtry—>serv addr[indx] = NULLSERV;
/* increment retry count and log this attempt */
rtry = (struct sng_rtry *) &(bfr—>bfrstart[0]);
rtry—>serv_addr[rtry—>retry_count] e serv;
rtry—>retry_count++;
/* have we reached max retries ? */
if    (rtry—>retry_count <= MAX RETRY)
      {
      /* look for a serv that has not yet been tried */
      CAM_appl = appl—>aht_addr—>appl_addr;
      for (appl = CAM_appl; appl '= NULLAPPL;
         appl = appl—>ul_dupl.next)
{
/* loop thru dupl queue */
   serv = appl—>peer addr—>serv_addr:
   serv—>rtry_flag = 0;
   for (indx = 0; indx < rtry—>retry_count; indx++)
         {
         /* comcare retrv serv to dupl queue serv */
         if   (serv == rtry—>serv_addr[indx])
              {
              serv—>rtry_flag = 1;
              break;
              }
         }
      }
   appl = s_load_balance(CAM_appl,sess);
   /* loop through servs and clear the retry flag */
   for (indx = 0; indx <= rtry—>retry_count; indx++)
      {
      serv = rtry—>serv_addr[indx];
      serv—>rtry_flag = 0;
      }
   return(appl);
   }
/* exceeded the retry limit */
appl = NULLAPPL;
return(appl);
}
/*******************************************************************
.*
.*   ROUTINE NAME:   s_retry_send_open
.*                   (Event = receive open reject / State = SESS_OPENING
.*
.*   BASIC FUNCTION: Resend the failed logon attempt to another server
.*                   having the same application name.
.*
.*
```

APPENDIX-continued

```
.*      METHOD:
.*      Get a data link for this session
.*      Queue this session control block to the link control block
.*      Lease a buffer and build a session printer open message
.*      Copy application name to the message
.*      Copy device name to the message
.*      If logon data
.*         Copy logmode data, save for possible retry
.*      If logon data
.*         Set message size to include the data
.*         Link the data to the message
.*         Set end-of-record at end of data
.*      Else
.*         Set length for header only and set end-of-record at end of header
.*      Call link send data
.*      Return to caller
.*
.*      CALL PARAMETERS: sess, appl,
.*
.*      RETURN PARAMETERS: None
.*
.*****************************************************************
int    s_retry_send_open(sess, appl, logon_bfc)
struct sng_sess *sess; /* session control block */
struct sng_appl *appl; /* application control block */
OTBFR2      *logon_bfc; /* possible logon data */
{
struct sng_link *link; /* link control block */
struct sng_dcb  *dcb; /* dcb */
OTBFR2          *bfc; /* buffer pointer */
OTBFR2 *next_bfc; /* buffer pointer */
struct sng_message *msg; /* gateway message */
unsigned int    index; /* loop index */
dcb = sess—>devc_addr—>dcb addr;
/*   set state to opening, link session to its appl   */
sess—>state = SESS_OPENING;
sess—>appl_addr = appl;
/*      find a data link for this session      */
link = l_get_link(appl);
sess—>link_addr = link;
/*      queue this session to the data link      */
sessq(link)
/*      build the terminal session open message      */
bfc =\(OTBER2 *)clease(1,_UNC,_NOHET),
msg = (struct sng_message *)&(bfc—>bfrstart[0]);
msg—>id = SESS_TERM_OPEN;
msg—>u_m.s_term_open.u_client_id.cb_pointer = sess; msg—>u_m.s_term_open.u_client_id.id_number =
sess—>sess_id
msg—>u_m.s_term_open.u_d.dcb_char = 0;
msg—>u_m.s_term_open.u_o.options = 0;
msg—>u_m.s_term_open.u_d.d.extended = dcb—>extended;
msg—>u_m.s_term_open.u_d.d.wsf_rpq = dcb—>wsf_rpq;
msg—>u_m.s_term_open.horizontal = dcb—>horizontal;
msg—>u_m.s_term_open.vertical = dcb—>vertical;
msg—>u_m.s_term_open.alt_horizontal = dcb—>alt_horizontal;
msg—>u_m.s_term_open.alt_vertical = dcb—>alt vertical;
msg—>u_m.s_term_open.in_size = dcb—>in_size;
msg—>u_m.s_term_open.out_size = dcb—>out_size;
msg—>u_m.s_term_open.u_d.d.start_stop = dcb—>start_stop;
for (index = 0; index < 8; ++index)
       msg—>u_m.s_term_open.appl_name[index] =
          appl—>aht_addr—>acb_addr—>appl_name[index];
for (index = 0; index < 8; ++index)
       msg—>u_m.s_term_open.devc_name[index] =
          sess—>devc_addr—>dcb_addr—>cam_name[index];
msg—>u_m.s_term_open.u_d.d.sess_type = SESS_TYPE_1;
msg—>u_m.s_term_open.u_o.o.definite = 0;
msg—>u_m.s_term_open.u_o.oxlate = 0;
for (index = 0; index < LOGMODE_SIZE; ++index)
       msg—>u_m.s_term_open.logmode[index] = dcb—>logmode name[index];
if (logon_bfc != NULLBFR2)
       {
       /* loop thru logon data, keep count of total bytes */
for(index=0,next_bfc = logon_bfc; next_bfc != NULLBFR2;
       next_bfc = next_bfc—>bfrchain)
    index+ = next bfc—>bfrtextk;
  /* copy the logon data, save for possible retry */
  s_copy_logon_bfc(sess,logon_bfc);
  }
```

APPENDIX-continued

```
bfc—>bfrchain = logon_bfc;
if (logon_bfc != NULLBFR2)
    {
    set_msg_length_3((sizeof(struct sess_term_open)), index);
    }
else
    {
    set_msg_length_1((sizeof(struct sess_term_open)));
    }
    /*      trace send open       */
    sngt(sess,sng_s_dupl,(long)DUPL_RETRY_SEND_S,
        (long)bfc,(long)sess);
/*      send the message      */
l_send_data(link, bfc);
return(CALL_SUCCEEDED);
}
```

I claim:

1. An apparatus for balancing a plurality of received processing requests among a plurality of servers of a processing system network, said processing system network further including at least one network node, said apparatus comprising:

a plurality of communication ports, wherein a subset of said plurality of communication ports are in operative communication with at least a first server, a second server and a first network node;

storage means for storing one or more measurable characteristics for at least each of said first server and said second server, wherein at least each of said first server and said second server are operative to run a plurality of common applications, said one or more measurable characteristics comprising network node measurable characteristics related to a number of network nodes being serviced by each of said first server and said second server and common application measurable characteristics related to a number of network nodes requesting each of said plurality of common applications; and a control circuit operative to receive a first processing request to run a selected one of said plurality of common applications from said first network node and, in response to said processing request, to determine which of said first server and said second server are capable of running said selected common application as a function of said network node measurable characteristics and said common application measurable characteristics and to select at least one of said first server and said second server to run said selected common application, said selection causing said selected at least one of said first server and said second server to run said selected common application.

2. The apparatus as set forth in claim 1 wherein said storage means is further operative to store a plurality of processing instructions and said control circuit comprises a processing unit operative to retrieve and execute at least a subset of said plurality of processing instructions from said storage means, said subset of processing instructions directing said control circuit to allocate at least one of said first server and said second server to run said selected common application.

3. The apparatus as set forth in claim 1 wherein said first network node is one of a processing system, a local area network and a wide area network.

4. The apparatus as set forth in claim 1 wherein at least one of said one or more stored measurable characteristics is selected from the group consisting of server processing capacity, server remaining processing capacity, server memory capacity, server remaining memory capacity, server capacity, server priority, server on/off, current network nodes servicing, current common application requests servicing, and application priority.

5. The apparatus as set forth in claim 1 wherein at least one of said one or more measurable characteristics is stored in said storage means using a subset of a plurality of linked list data cells.

6. The apparatus as set forth in claim 5 wherein said control circuit further comprises means for traversing ones of said subset of linked list data cells to retrieve said one or more linked measurable characteristics.

7. The apparatus as set forth in claim 1 wherein said control circuit is further operative to receive a signal indicating that said selected at least one of said first and second server is unavailable to run said selected common application, and, in response to said received signal, to select at least one of said first server and said second server to run said selected common application as a function of said one or more measurable characteristics.

8. The apparatus as set forth in claim 1 wherein said control circuit is further operative, in response to said first processing request, to select at least one of said first server and said second server as a function of at least one of balancing ones of said plurality of processing requests among ones of said plurality of servers and overall server response time.

9. A method for balancing a plurality of received processing requests among a plurality of servers of a processing system network, said processing system network further including at least one network node, said method comprising the steps of:

receiving a first processing request to run a selected common application from a first network node, wherein at least each one of a first server and a second server is operative to run a plurality of common applications;

in response to said first processing request, determining which of said first server and said second server are capable of running said selected common application as a function of one or more measurable characteristics, said one or more measurable characteristics comprising network node measurable characteristics related to a number of network nodes being serviced by each of said first server and said second server and common application measurable characteristics related to a number of network nodes requesting each of said plurality of common applications; and selecting at least one of said first server and said second server to run said selected common application, said step of selecting causing said selected at least one of said first server and said second server to run said selected common application.

10. The method as set forth in claim 9 further comprising the step of storing one or more of said plurality of measurable characteristics for at least a subset of said plurality of servers.

11. The method as set forth in claim 10 further comprising the step of retrieving said subset of said plurality of measurable characteristics.

12. The method as set forth in claim 9 further comprising the steps of:

storing a plurality of processing instructions; and retrieving and executing at least a subset of said plurality of stored processing instructions to allocate at least one of said first server and said second server to run said selected common application.

13. The method as set forth in claim 9 wherein at least one of said plurality of stored measurable characteristics is selected from the group consisting of server processing capacity, server remaining processing capacity, server memory capacity, server remaining memory capacity, server capacity, server priority, server on/off, current network nodes servicing, current application requests servicing, and application priority.

14. The method as set forth in claim 9 further comprising the step of utilizing a subset of a plurality of linked list data cells to store at least one of said plurality of stored measurable characteristics.

15. The method as set forth in claim 14 further comprising the step of traversing ones of said subset of linked list data cells to retrieve at least one of said subset of linked measurable characteristics.

16. The method as set forth in claim 9 further comprising the steps of:

receiving a signal indicating that at least one of said selected at least one of said first server and said second server is unavailable to run said selected common application; and selecting, in response to said received signal, at least one of said first server and said second server to run said selected common application as a function of at least one of said measurable characteristics.

17. The method as set forth in claim 9 further comprising the step of selecting, in response to said first processing request, at least one of said first server and said second server as a function of at least one of balancing ones of said plurality of processing requests among ones of said plurality of servers and overall server response time.

18. An apparatus for balancing a plurality of processing requests among a plurality of servers, said plurality of processing requests received from a plurality of network nodes, said apparatus comprising:

storage means for storing one or more measurable characteristics for at least a subset of said plurality of servers, wherein at least a first server and a second server are members of said subset and are operative to run a selected one of a plurality of common applications, and wherein said one or more stored measurable characteristics comprises network node measurable characteristics related to a number of network nodes being serviced by each of said first server and said second server and common application measurable characteristics related to a number of network nodes requesting each of said plurality of common applications; and processing means for determining, in response to a first processing request, which of said first server and said second server are capable of running said selected common application as a function of said one or more measurable characteristics and selecting at least one of said first server and said second server to run said selected common application, said selection causing said selected at least one of said first server and said second server to run said selected common application.

19. The apparatus as set forth in claim 18 wherein said processing means further includes means for receiving a first request to run said selected common application.

20. The apparatus as set forth in claim 18 wherein said processing means is further operative to direct said selected at least one of said first server and said second server to run said selected common application.

21. The apparatus as set forth in claim 18 wherein said storage means is further operative to store a plurality of processing instructions and said processing means is further operative to retrieve and execute a subset of said plurality of processing instructions from said storage means, said subset of processing instructions directing said processing means to select at least one of said first server and said second server to run said selected common application.

22. The apparatus as set forth in claim 18 wherein at least a subset of said plurality of network nodes is one of a processing system, a local area network and a wide area network.

23. The apparatus as set forth in claim 18 wherein at least one of said one or more measurable characteristics is stored in said storage means using a plurality of linked list data cells.

24. The apparatus as set forth in claim 23 wherein said processing means includes means for traversing said subset of said plurality of linked list data cells to retrieve said one or more linked measurable characteristics.

25. The apparatus as set forth in claim 18 wherein said processing means further comprises:

means for receiving a signal indicating that said selected at least one of said first server and said second server is unavailable to run said selected common application; and means, responsive to said received signal, for selecting at least one of said first server and said second server to run said selected common application as a function of said one or more measurable characteristics.

26. The apparatus as set forth in claim 18 wherein said processing means is further operative, in response to said first processing request, to select at least one of said first server and said second server as a further function of at least one of balancing ones of said plurality of processing requests among ones of said plurality of servers and overall server response time.

* * * * *